US009032018B2

(12) United States Patent
Quinn

(10) Patent No.: US 9,032,018 B2
(45) Date of Patent: May 12, 2015

(54) PROVISIONING OF CONTENT ITEMS IN MOBILE COMMUNICATIONS NETWORKS

(75) Inventor: Karl Quinn, Loreto Abbey (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1070 days.

(21) Appl. No.: 13/120,755

(22) PCT Filed: Nov. 7, 2008

(86) PCT No.: PCT/EP2008/009431
§ 371 (c)(1),
(2), (4) Date: Sep. 12, 2011

(87) PCT Pub. No.: WO2010/034336
PCT Pub. Date: Apr. 1, 2010

(65) Prior Publication Data
US 2011/0314089 A1 Dec. 22, 2011

(30) Foreign Application Priority Data

Sep. 24, 2008 (WO) .................. PCT/EP2008/062799

(51) Int. Cl.
*G06F 15/16* (2006.01)
*H04L 12/58* (2006.01)
(Continued)

(52) U.S. Cl.
CPC ...... *H04L 12/5865* (2013.01); *G06F 17/30867* (2013.01); *G06Q 30/02* (2013.01);
(Continued)

(58) Field of Classification Search
USPC ......... 709/206, 203, 217, 204, 219, 236, 202, 709/205, 209, 218, 221, 227, 229, 233, 709/250; 705/14.55, 14.51, 14.64, 14.69, 705/14.71, 14.1, 14.23, 14.53, 14.54, 14.66, 705/14.49, 14.57, 14.72, 14.73; 455/456.1, 455/404.2, 457
See application file for complete search history.

(56) References Cited

U.S. PATENT DOCUMENTS 8,611,919 B2 * 12/2013 Barnes, Jr. ................. 455/456.1
2004/0266414 A1 12/2004 Likwornik
(Continued)

FOREIGN PATENT DOCUMENTS

JP 2000-316189 11/2000
KR 1020040089237 10/2004
(Continued)

OTHER PUBLICATIONS

International Search Report corresponding to PCT Application No. PCT/EP2008/062799, Date of Mailing: Nov. 16, 2009.
(Continued)

*Primary Examiner* — Saket K Daftuar
(74) *Attorney, Agent, or Firm* — Myers Bigel Sibley & Sajovec, P.A.

(57) ABSTRACT

The invention relates to a targeting technique for controlling the provisioning of content items, for example advertisements, to users in a mobile communications network (100). A method embodiment of the technique is performed in a provisioning server (114) in the mobile communications network and comprises the steps of receiving an indication of a content item which has been selected by a first user via a first mobile terminal (126); retrieving, from a user-related database, contact information associated with the first user, wherein the contact information indicates at least one second user (128); determining a location of a second mobile terminal of the second user; and selectively initiating, if an intended presentation area for the selected content item covers the location of the second mobile terminal, a presentation of the selected content item to the second mobile terminal (128).

13 Claims, 10 Drawing Sheets

(51) Int. Cl.
  *G06F 17/30* (2006.01)
  *G06Q 30/02* (2012.01)
  *H04M 3/22* (2006.01)
  *H04M 3/42* (2006.01)
  *H04M 3/493* (2006.01)
  *H04W 4/02* (2009.01)

(52) U.S. Cl.
  CPC ............ H04L12/5895 (2013.01); H04L 51/20 (2013.01); *H04M 3/2218* (2013.01); *H04M 3/42348* (2013.01); *H04M 3/4931* (2013.01); *H04W 4/02* (2013.01)

(56) References Cited

U.S. PATENT DOCUMENTS

| | | | |
|---|---|---|---|
| 2005/0259798 | A1 | 11/2005 | Yarlagadda et al. |
| 2006/0282328 | A1* | 12/2006 | Gerace et al. .................... 705/14 |
| 2007/0265923 | A1* | 11/2007 | Krassner et al. ................ 705/14 |
| 2008/0104225 | A1 | 5/2008 | Zhang et al. |
| 2008/0215428 | A1* | 9/2008 | Ramer et al. .................... 705/14 |
| 2009/0233629 | A1* | 9/2009 | Jayanthi ........................ 455/457 |
| 2011/0191432 | A1* | 8/2011 | Layson, Jr. .................... 709/206 |
| 2011/0258049 | A1* | 10/2011 | Ramer et al. ............... 705/14.66 |

FOREIGN PATENT DOCUMENTS

| | | |
|---|---|---|
| KR | 1020050028368 | 3/2005 |
| WO | WO 01/47231 | 6/2001 |
| WO | WO 02/03622 | 1/2002 |
| WO | WO 2007/136314 | 11/2007 |

OTHER PUBLICATIONS

International Search Report corresponding to PCT Application No. PCT/EP2008/009431, Date of Mailing: Jul. 2, 2009.
Written Opinion of the International Searching Authority corresponding to PCT/EP2008/009434, Date of Mailing: Jul. 2, 2009.
Notification of Transmittal of the International Preliminary Report on Patentability corresponding to PCT/EP2008/009431, Date of Mailing: Jan. 27, 2011.

* cited by examiner

PROVISIONING OF CONTENT ITEMS IN MOBILE COMMUNICATIONS NETWORKS

CROSS REFERENCE TO RELATED APPLICATION

This application is a 35 U.S.C. §371 national stage application of PCT International Application No. PCT/EP2008/009431, filed 7 Nov. 2008, which claims the benefit of priority under 35 USC §120 as a continuation-in-part (CIP) of PCT International Application No. PCT/EP2008/062799, filed 24 Sep. 2008. PCT International Application No. PCT/EP2008/009431 was published in the English language as International Publication No. WO 2010/034336 A1 on 1 Apr. 2010, and PCT International Application No. PCT/EP2008/062799 was published in the English language as International Publication No. WO 2010/034345 A1 on 1 Apr. 2010. The disclosures of both of the above referenced applications are hereby incorporated herein in their entireties by reference.

TECHNICAL FIELD

The invention relates to the provisioning of content items, for example advertisements, in mobile communications networks. More specifically, the invention relates to targeting techniques for controlling the provisioning of such content items to users in a mobile communications network.

BACKGROUND

In the popular and widespread Internet, an increasing number of services aim at providing content to an "open circle" of users which have not explicitly requested that particular content. A typical example is the placement of advertisements (ads) on web pages. Another example is a news service aiming at providing news of particular interest to users on web pages or as a newsletter via email push. Still another example is the provision of invitations or announcements in a business, public or private environment; consider, e.g. an invitation to an upcoming cultural event which shall be distributed via email to all interested people in a town.

A common characteristic to the above examples is that it is not possible to define in advance the users who may be interested in the content: In general, a user requesting a web page from, e.g., a search engine or a user being registered with its email address in a social network such as Facebook or MySpace may or may not be interested in receiving a particular advertisement, news or invitation. In case of business-related content distributions, however, a service provider will generally want to provide a personalized service, i.e. wants to target the provision of any particular content item to users who are actually interested in it.

Such targeting is also an important aspect from a network perspective: As untargeted advertisement emails, for example, require the largest available distribution list in order to eventually reach at least few interested users, such emails—widely known as spam—lead to considerable network load and crowded mail boxes. As the overwhelming majority of recipients is not interested in the ads, this leads to a waste of network and storage resources. In a mobile network environment, transmission resources over the radio interface as well as storage resources in mobile terminals are particularly limited; untargeted content distribution services definitively have to be avoided here.

In order to generally enable the provision of "open circle" services such as that exemplarily outlined above, efficient targeting mechanisms are required which allow selecting from a large group of users those who have a high likelihood of being interested in the content. In the advertisement field, companies such as Google and many others are highly involved in developing efficient targeting schemes. Such schemes will be of particular importance for mobile networks, as otherwise open circle services cannot be implemented therein from a practical point of view. Vice versa, provision of an efficient automatic targeting scheme for unrequested content items by a mobile network operator can lead to an improved usefulness of mobile networks for the users and improved benefits for the content providers.

SUMMARY

There is a demand for a targeting scheme for a provision of content items to users in mobile communications networks, which is efficient in terms of transmission resource usage in the network and storage resource usage in the network and/or the mobile terminals.

This demand is satisfied by a method which is performed by a provisioning server in a mobile communications network. The method is related to controlling a provisioning of content items to users in the mobile communications network. The method comprises the steps of receiving an indication of a content item which has been selected by a first user via a first mobile terminal; retrieving, from a user-related database, contact information associated with the first user, wherein the contact information indicates at least one second user; determining a location of a second mobile terminal the second user; and selectively initiating, if an intended presentation area for the selected content item covers the location of the second mobile terminal, a presentation of the selected content item to the second mobile terminal. The provisioning server shall not be interpreted as only meaning a single server host device, but is also intended to cover a server host farm which implements the method steps performed by the provisioning server.

At least one of the first user and the second user may be a mobile subscriber of the mobile communications network. In one implementation of the method, the user-related database comprises a subscriber-related database associated with the mobile communications network. In this case, the subscriber-related database may, for example, comprise a call data record (CDR) database of the mobile communications network. Such a CDR database may be provided for recording past calls of the first subscriber. Additionally or alternatively, the user-related database may comprise a community database containing user profiles of users of a social network. A social network is a communications network comprising at least multiple user profiles and social network service functions for interrelating the user profiles. An example of a service function is a search function for searching users of the social network according to one or more user profile parameters. The social network may be separate from the mobile communications network.

According to some realizations of the above method, the intended presentation area for the selected content item is selected from one of multiple overlapping areas with different geographical extensions. In one realization, the overlapping areas comprise at least a micro area and a macro area, and the micro area has a smaller geographical extension than the macro area. In an implementation of this realization content items intended for presentation in the micro area are cached in a local repository in a network portion of the mobile communications network associated with the micro area and content items intended for presentation in the macro area are cached in a central repository of the mobile communications network. The step of initiating the presentation of the selected content item may then comprise initiating retrieval of the selected content item from the local repository or central repository dependent on the intended presentation area of the selected content item.

Some variants of the above method comprise in the provisioning server the further steps of determining a social network click-through rate of the selected content item based on the at least one second user indicated by the contact information of the first user; and determining a ranking of the content item in relation to other content items based on the social network click-through rate of the selected content item. In one realization, the social network click-through rate of the selected content item is determined based on the number of second users which have been presented with the selected content item and the number of second users which have been clicked on the selected content item.

Some implementations of the above method comprise in the provisioning server the step of retrieving information related to the selected content items for determining the social network click-through rate from the local repository or central repository dependent on the intended presentation area of the selected content item.

The above-mentioned demand is further satisfied by a method which is performed by a content repository adapted for a provisioning of content items to users in a predefined area of a mobile communications network. The method comprises the steps of caching a content item with an intended presentation area overlapping with the predefined area; storing an indication of the number of users to which the content item is presented in the predefined area; storing an indication of the number of users which have selected the presented content item in the predefined area; and providing the stored number indications for a determination of a cached content item click-through rate related to the predefined area.

Some variants of this method comprise in the content repository the further steps of determining a social network click-through rate of the selected content item based on the at least one second user indicated by the contact information of the first user; and determining a ranking of the content item in relation to other content items based on the social network click-through rate of the selected content item. In one realization, the social network click-through rate of the selected content item is determined based on the number of second users which have been presented with the selected content item and the number of second users which have been clicked on the selected content item.

Some implementations of the above method comprise in the content repository the step of retrieving information related to the selected content items for determining the social network click-through rate from the local repository or central repository dependent on the intended presentation area of the selected content item.

Moreover, the above-mentioned demand is satisfied by a computer readable medium having computer executable instructions for performing the method according to any one of the preceding claims. The computer may comprise one or more computing devices for implementing, for example, a provisioning server or a repository. The computer readable medium may be a permanent or re-writeable memory within or associated with a computing device or a removable CD-ROM, DVD or USB-stick.

The above-mentioned demand is further satisfied by a provisioning server adapted for controlling a provisioning of content items to users in a mobile communications network. The server comprises a reception component adapted to receive an indication of a content item which has been selected by a first user via a first mobile terminal; a retrieval component adapted to retrieve, from a user-related database, contact information associated with the first user, wherein the contact information indicates at least one second user; a location determination component adapted to determine a location of a second mobile terminal of the second user; and a selection component adapted to selectively initiate, if an intended presentation area for the selected content item covers the location of the second mobile terminal, a presentation of the selected content item to the second mobile terminal.

In one implementation, the retrieval component of the provisioning server is adapted to retrieve the contact information from a subscriber-related database associated with the mobile communications network. According to some variants of this implementation, the retrieval component is adapted to retrieve the contact information from a call data record database of the mobile communications network.

According to some realizations of the provisioning server, the selection component is adapted to initiate retrieval of the selected content item from a local repository or a central repository dependent on the intended presentation area of the selected content item.

In one implementation of the provisioning server, the selection component is adapted to determine a social network click-through rate of the selected content item based on the at least one second user indicated by the contact information of the first user; and the selection component is further adapted to determine a ranking of the content item in relation to other content items based on the social network click-through rate of the selected content item. In some variants of this implementation, the selection component is adapted to retrieve information related to the selected content items for determining the social network click-through rate from a local repository or a central repository dependent on the intended presentation area of the selected content item.

The above-mentioned demand is still further satisfied by a repository adapted for a provisioning of content items to users in a predefined area of a mobile communications network. The repository comprises a component adapted to cache a content item with an intended presentation area overlapping with the predefined area; a component adapted to store an indication of the number of users to which the content item is presented in the predefined area; a component adapted to store an indication of the number of users clicking on the presented content item in the predefined area; and a component adapted to provide the stored number indications for a determination of a cached content item click-through rate related to the predefined area.

Eventually the above-mentioned demand is satisfied by a mobile communications network comprising a provisioning server and one or more repositories as outlined above. The provisioning server may be co-located with one or more of the repositories, or may be co-located with a control node in a radio access part of the mobile communications network, e.g. a Radio Base Station, or may be a stand-alone entity.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth with regard to an advertisement provisioning system in a mobile communications network in order to provide a thorough understanding of the current invention. It will be apparent to one skilled in the art that the current invention may be practiced in other embodiments that depart from these specific aspects. For example, the skilled artisan will appreciate that the current invention may be implemented for any service aiming at the provision of personalized content items such as news, announcements or offerings. Further, the techniques proposed herein may be implemented in any communications network including the general Internet, intranets of companies, etc. based on wireless and/or wireline network technologies.

Those skilled in the art will further appreciate that functions explained hereinbelow may be implemented using individual hardware circuitry, but also using software functioning in conjunction with a programmed microprocessor, field-programmable gate array (FPGA), application specific integrated circuit (ASIC), one or more digital signal processors (DSPs) or a general purpose processor. It will also be appreciated that when the current invention is described as a method, it may also be embodied in a computer processor and a memory coupled to the processor, wherein the memory is encoded with one or more programs that perform the methods disclosed herein when executed by the processor.

Figure 1:
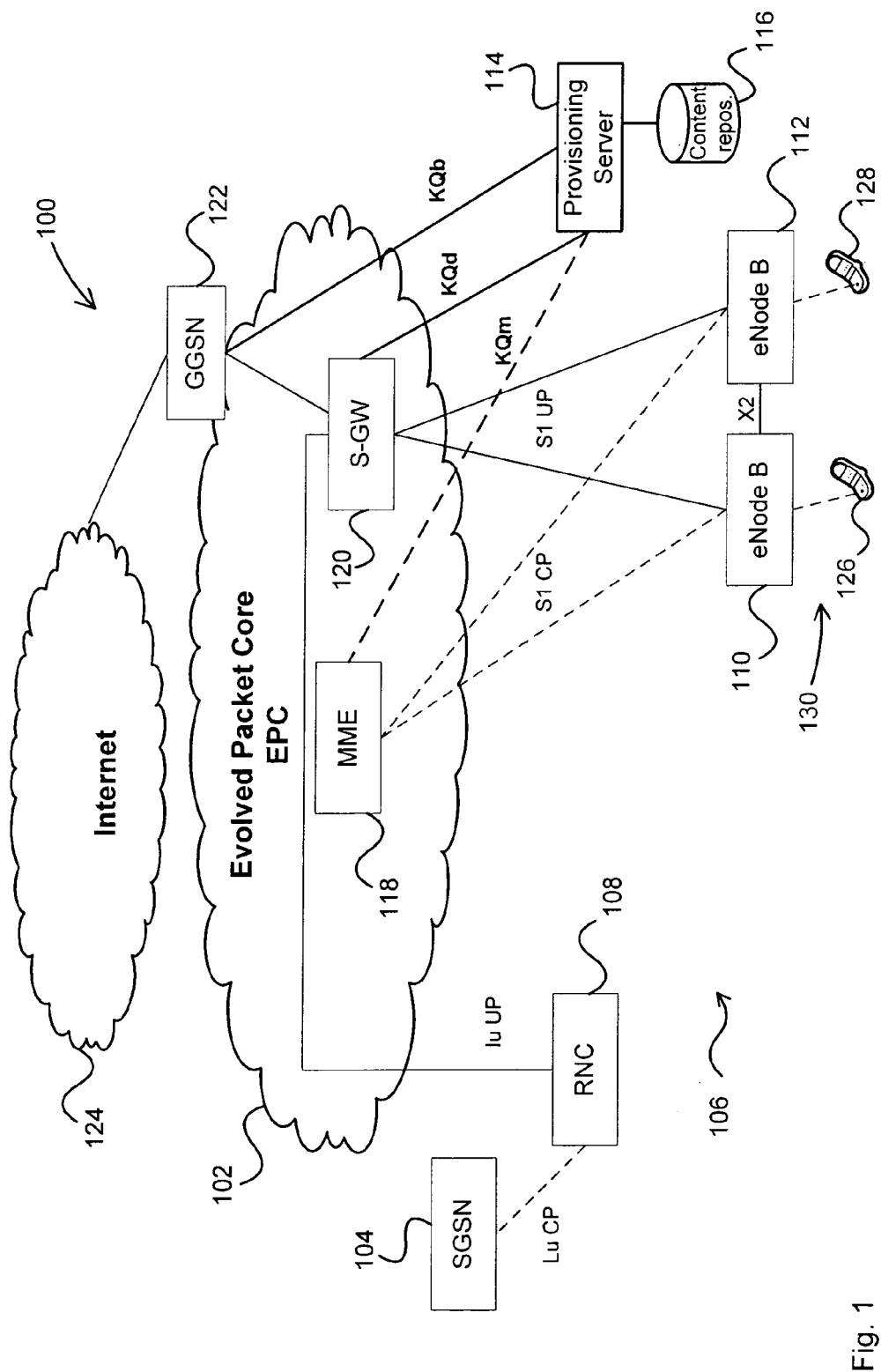
FIG. 1 schematically illustrates an embodiment of a mobile communications network adapted for a provisioning of content items.

FIG. 1 illustrates an embodiment of a mobile communications network 100 realized as an UMTS LTE (Long Term Evolution) network comprising an EPC (Evolved Packet Core) 102, a PS domain represented by an SGSN (Serving GPRS Support Node) 104 and a radio access part 106 comprising an RNC (Radio Network Controller) 108, eNode Bs (radio base stations) 110 and 112, a provisioning server 114 and a content repository for caching content items termed RnCN (Radio network Caching Node) 116. The core network 102 comprises an MME (Mobility Management Entity) 118 and a S-GW (Serving Gateway) 120. A GGSN (Gateway GPRS Support Node) 122 connects network 100 to the general Internet 124. The mobile communications network 100 operates to provide content items, in particular advertisements, to mobile users such as the users of mobile terminals 126 and 128. A flow of information between some of the components in a Control Plane (CP) or a User Plane (UP) is additionally illustrated in FIG. 1 by solid or dashed connecting lines.

While the provisioning server 114 is illustrated as being co-located with the content repository 116 in FIG. 1, in other embodiments a provisioning server may be colocated with a BSS (Base Station Subsystem) or OSS (Operating Station System). The provisioning server 114 and content repository 116, while being connected with the MME 116 and S-GW 118, may also be located close to the GGSN 122 serving as a gateway to the Internet 124, and may thus be located close to the edge of the LTE network 100. This configuration enables that content items such as advertisements, but also web-pages received from content providers in the Internet 124 may be efficiently cached close to the users 126 and 128. Moreover, the nodes 114 and/or 116 may monitor efficiently which content items are served to the users 126 and 128 and what is the Click-Through Rate (CTR) for a particular content item. The repository 116 is employed as a local repository for content items intended for presentation in at least a part of the micro area 130 formed by the geographical area which is served by the eNode Bs 110 and 112. For example, micro area 130 may cover the area of a city. In other embodiments, the repository 116 may additionally or alternatively be employed as a central repository for a macro area such as a country or similar area with a large geographical extension compared to the micro area 130.

Figure 2:
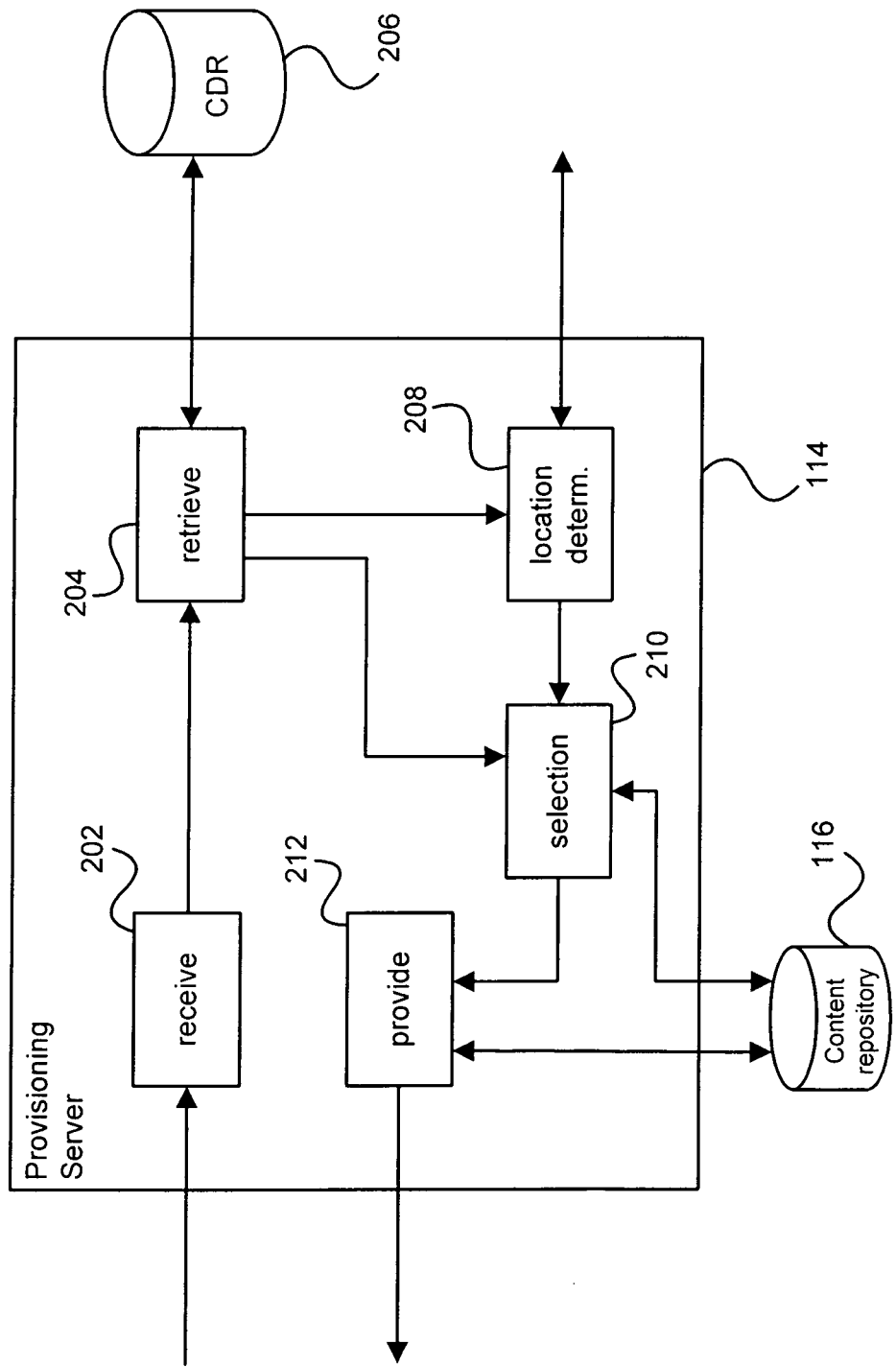
FIG. 2 is a functional block diagram illustrating an embodiment of the provisioning server of FIG. 1.
Figure 3:
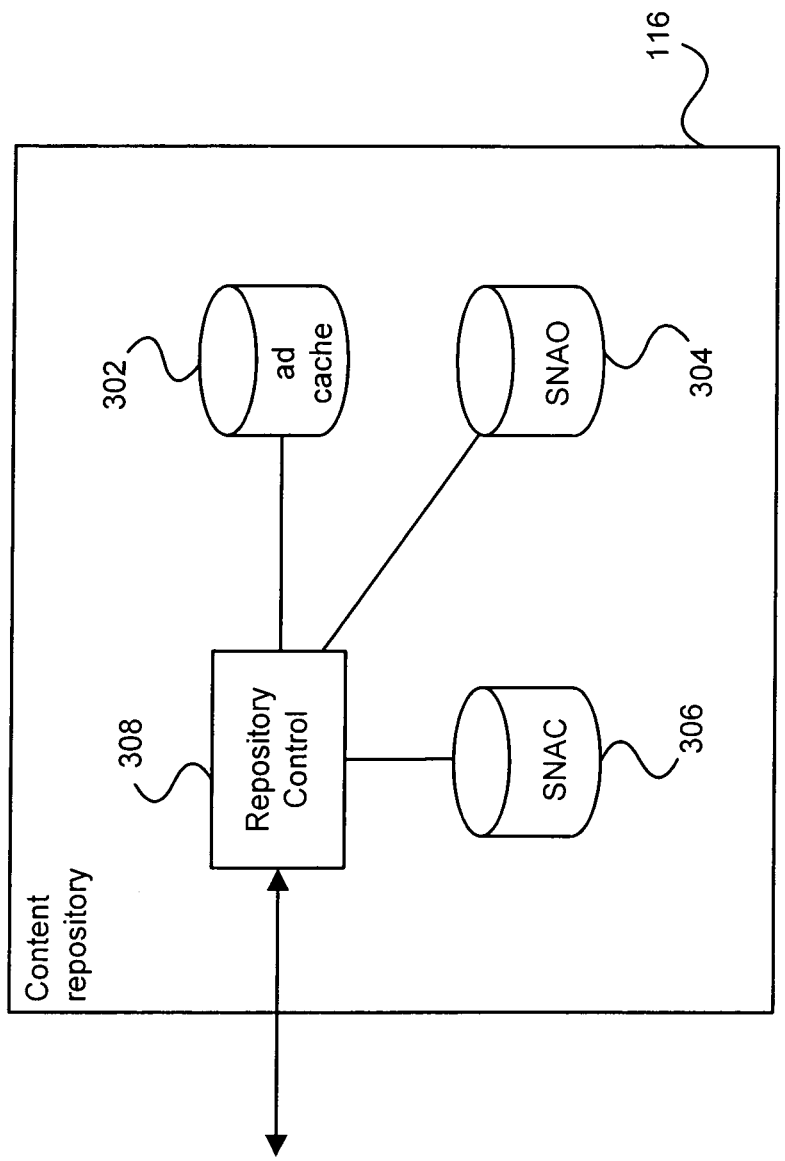
FIG. 3 is a functional block diagram illustrating an embodiment of the content repository of FIG. 1.

For later reference, functional components of specific embodiments of the provisioning server 114 and content repository 116 are illustrated in FIGS. 2 and 3, respectively. Referring to FIG. 2, the provisioning server 114 is illustrated to comprise a reception component 202, a retrieval component 204 adapted for connection with a Call Data Record (CDR) database 206, a location determination component 208, a selection component 210 and a provisioning component 212. Components 210 and 212 are adapted for connection with the content repository 116. The embodiment of the content repository 116 illustrated in FIG. 3 comprises a caching component 302, further user-related storage components 304 and 306 and a provisioning component 308.

The functionality of one or both of the provisioning server 114 and the content repository 116 as illustrated in FIGS. 2 and 3 and described below may be implemented in software, i.e. each of the blocks referenced as 114 and 116 in the figures may be understood as comprising a software and/or firmware package for implementation on a general purpose hardware, or on a more specific hardware such as one or more ASICs, FPGAs or DSPs. Each of the provisioning server 114 and the content repository 116 may be implemented on a separate hardware platform. In some embodiments, the provisioning server 114 and the repository 116 are implemented on a common hardware platform.

Figure 4:
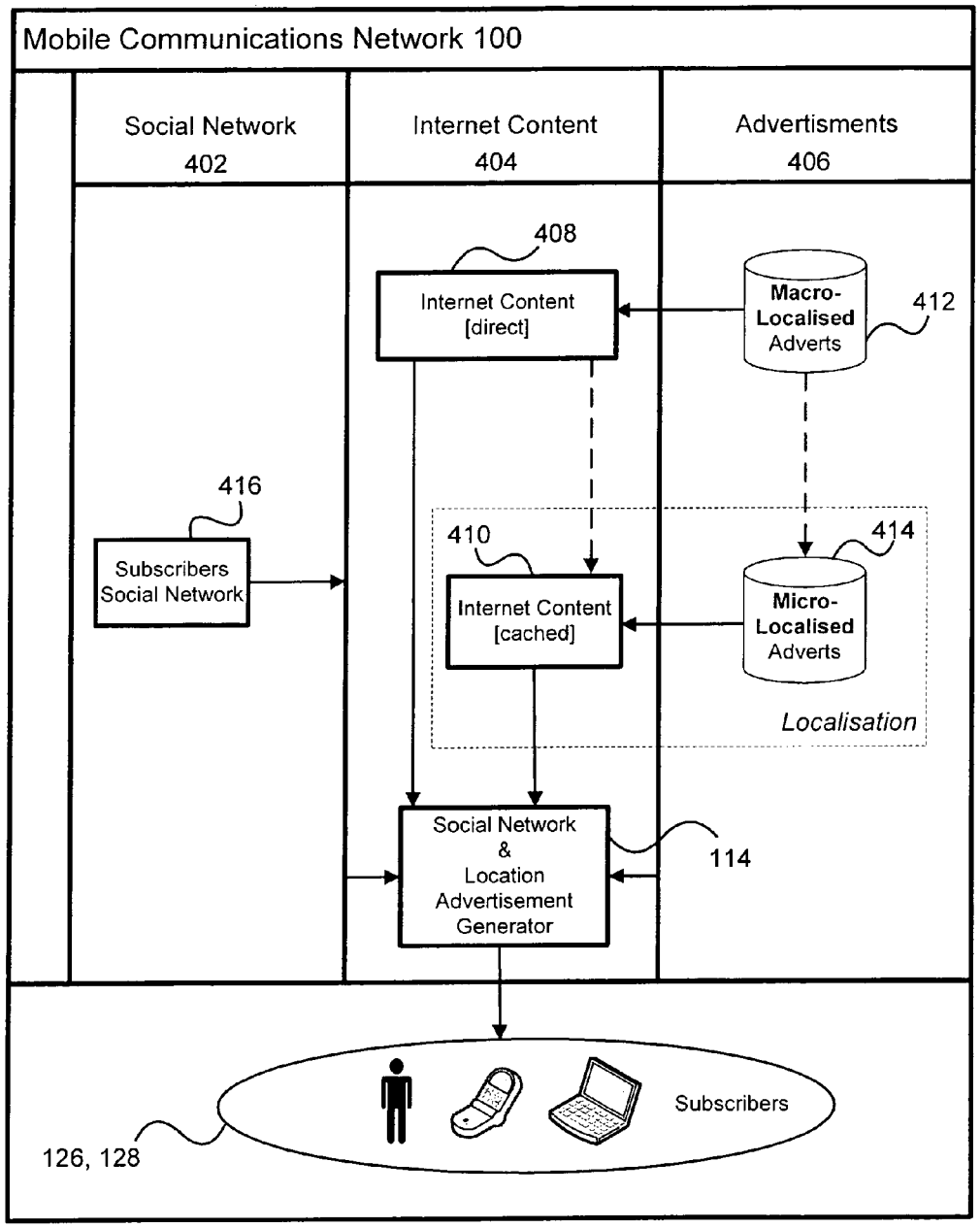
FIG. 4 illustrates a data input to an operation of the network of FIG. 1.

With regard to an operation of the provisioning server 114 and content repository 116 in order to implement an efficient targeting scheme, FIG. 4 illustrates on an abstract level the data which are accounted for when controlling a provisioning of content items to users 126 and 128. Data is used from a social network domain 402, an Internet content domain 404 and an advertisements domain 406. The provisioning server 114 may retrieve Internet content 408 directly from Internet and/or may retrieve cached content 410 from the content repository 116. The Internet content 408, 410 may comprise web page content for rendering on a mobile terminal display of users 126 or 128. Advertisements intended for presentation in a macro area (macro-localised ads 412) and/or advertisements intended for presentation in a micro area (micro-localised ads 414) may further be provided to the users 126 and 128 depending on the targeting scheme to be described below. The decision logic of this scheme requires data related to users or subscribers 416 of one or more social networks in which one or both of users 126 and 128 are involved.

A rough sketch of the processing of the data in FIG. 4 is as follows: In case user 126 clicks on an advertisement presented to him or her, the server 114 operates to determine a social network of user 126 and prepares a presentation of the clicked advertisement to other users of this social network. Upon determination of whether a particular social network user, e.g. user 128, is located within the intended presentation area of the advertisement, the advertisement may selectively be released for presentation to this user. The presentation may then comprise to weave or render the ad into a web page requested by user 128 in a conventional manner.

Figure 5:
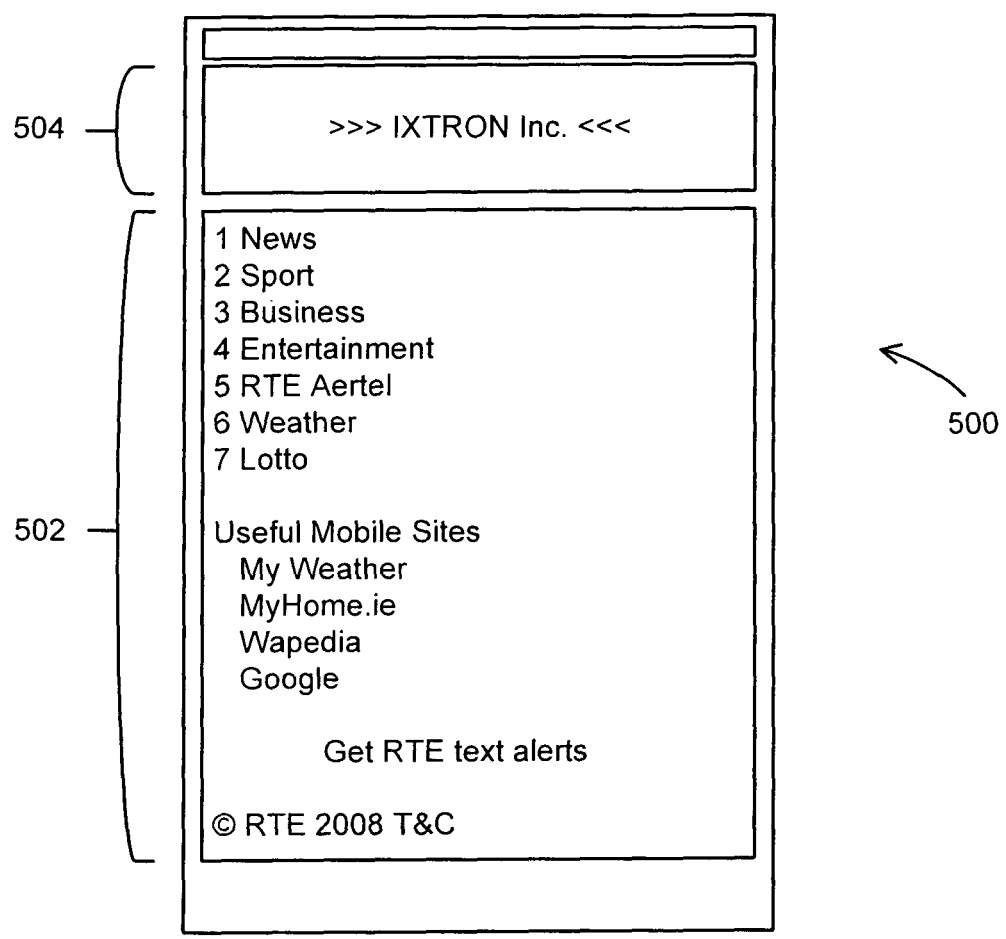
FIG. 5 schematically illustrates a content item presentation on a screen of a mobile terminal.

FIG. 5 illustrates a schematic example of a webpage 500 which may have been requested from a user for presentation on a mobile terminal. The page 500 comprises a first page area 502, which is in this example a main menu of a web representation of a company in Ireland. A second page area 504 is provided for a presentation of at least one advertisement. In general, the second page area 504 may be implemented as an advertisement container that may comprise different advertisements when presenting the same webpage 502 to different users, i.e. the second page area 504 may be configured as a placeholder for different advertisements. According to the targeting scheme described herein, a first user clicking on an advertisement presented in the area 504 may trigger that the same advertisement will anonymously be prepared for presentation to second users belonging to the first user's social network. For example, a second user may be presented with the same advertisement although he or she requests a different webpage than shown in the first page area 502 to the first user.

Figure 6:
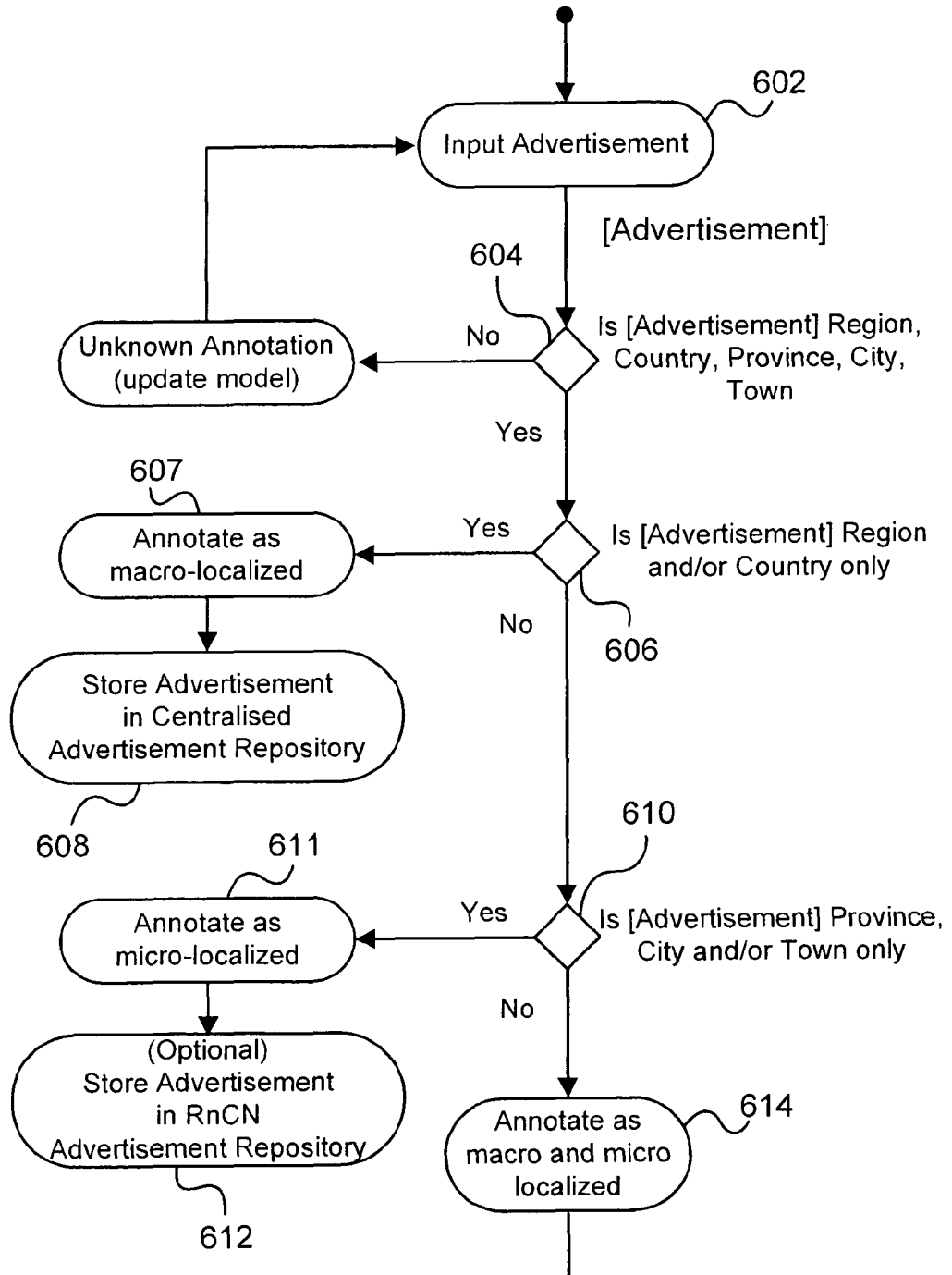
FIG. 6 is a flow diagram illustrating a first operation of the network of FIG. 1.

FIG. 6 illustrates an embodiment of a method 600 of preparing advertisements for being provided to users according to the targeting scheme proposed herein. It is to be noted that method 600 works besides advertisements for any kind of content items, e.g. news, announcements, invitations, etc. As a prerequisite for method 600 an advertisement is provided with at least one annotation or tag or similar associated information element indicating an intended presentation area for the advertisement. For example, the intended presentation area may be the area of the city of Dublin. As another example, the intended presentation area may be the area of Ireland. In still another example, multiple keywords may be assigned such as 'Ireland, London'.

The method 600 starts in step 602 with accepting a particular advertisement. In step 604, some error handling is performed by determining whether the intended presentation area is known to the provisioning system. In step 606 it is determined whether the indicated presentation area is a macro area covered at least in part by the mobile network 100. Generally, the provisioning system may classify any intended presentation area according to a type scheme of presentation areas. For reasons of illustration, only two different types of presentation area are defined, namely 'micro area' and 'macro area'. While micro areas may reflect the areas covered by a radio access part such as radio access part 106 in FIG. 1, while a macro area may generally cover several radio access parts, such that content items with intended for presentation in such a macro area may preferably be stored in a central content repository. For example, a micro area may cover the geographical area of a city, province or postal code, while a macro area may cover a country or similar region with a significantly larger extension.

The classification of a particular intended presentation area as 'macro area' may be performed automatically by the provisioning system, e.g. based on the known coverage of the mobile network of the indicated intended presentation area. Alternatively, the classification may be specified manually by the network operator, an advertisement service provider or the advertiser itself.

Referring back to step 606, assuming the intended presentation area is Ireland as known to the provisioning system, the area is classified as macro area and the advertisement is provided to a central advertisement repository of the network 100 in step 608. The step 607 is an optional step of explicitly adding an annotation indicating that the ad is macro-localised thereto. This annotation may be used for distributing the ad.

In case in step 606 it is decided that the intended presentation area is not a macro area, in step 610 it is determined whether the presentation area is a micro area. If this is the case, the advertisement is stored in the corresponding local content repository in step 612. As an example, the ad may have the intended presentation area of the city of Dublin and may thus be stored in the content repository 116 of FIG. 1. The step 611 is an optional step of explicitly adding an annotation indicating that the ad is micro-localised thereto. Advertisements, whose intended presentation area covers only partly a micro area may be sorted out in step 604. A corresponding micro area may accordingly be defined or the intended presentation area may be redefined for that particular ad.

As indicated by step 614, there may also be advertisements comprising macro area(s) and micro area(s) for the intended presentation area. The process of distributing an advertisement intended, for example, for presentation in Ireland and in London to a central content repository for the country of Ireland and a local repository for the city of London works very much as a concatenation of the steps 606-612 and a detailed explanation thereof is therefore omitted.

Figure 7:
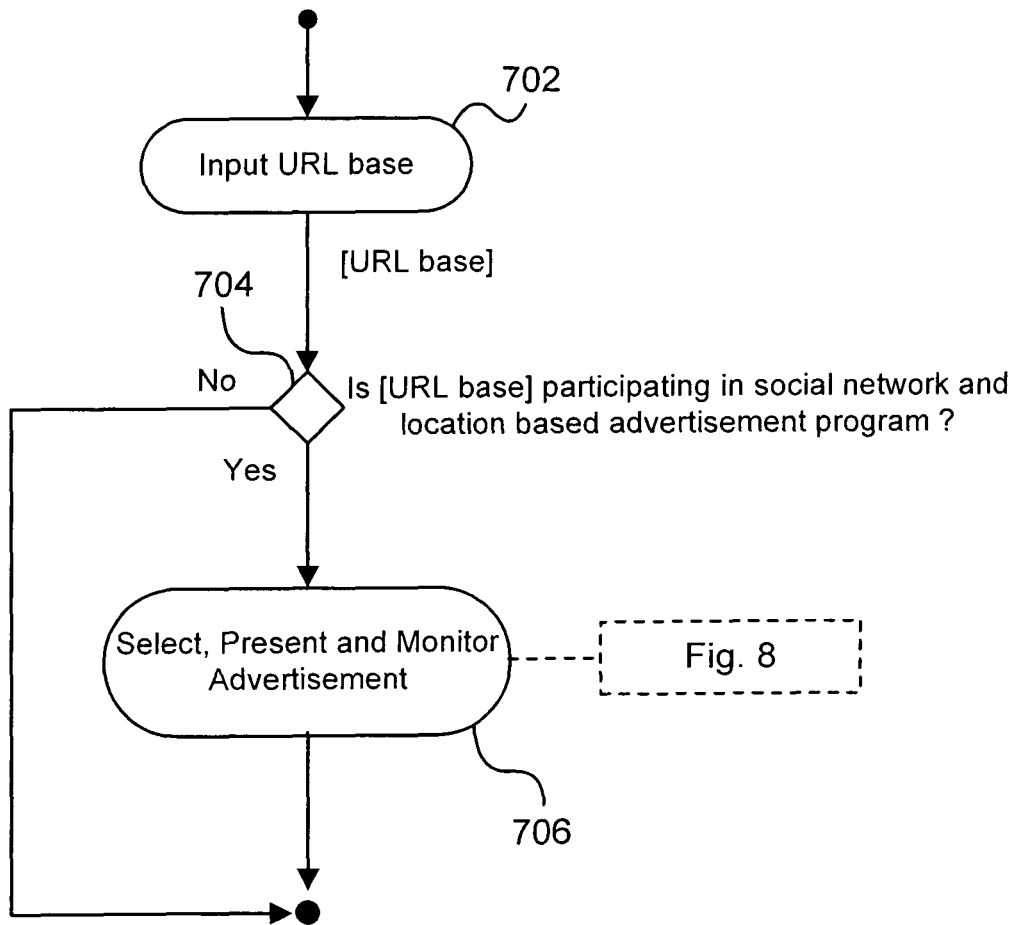
FIG. 7 is a flow diagram illustrating a second operation of the network of FIG. 1.

FIG. 7 illustrates a principle of operation for the provisioning of an advertisement to user 126 in FIG. 1. It is assumed that the advertisement is available in the local content repository 116. User 126 may request a webpage by indicating the corresponding URL to the network 100. In step 702, the webpage request is intercepted, for example by an appropriate trigger point in S-GW 120 in the core network 102. The S-GW 120 may deliver the intercepted URL to provisioning server 114. In step 704 it is determined whether the URL matches a list of URLs participating in an advertisement program applying the targeting mechanism as described here. If this is the case, one or more appropriate advertisements may be selected for presentation to the user 126 in step 706, which also comprises monitoring the presentation of the advertisement in order to determine whether the user 126 clicks on the advertisement. The details of step 706 will be described in the following.

Figure 8:
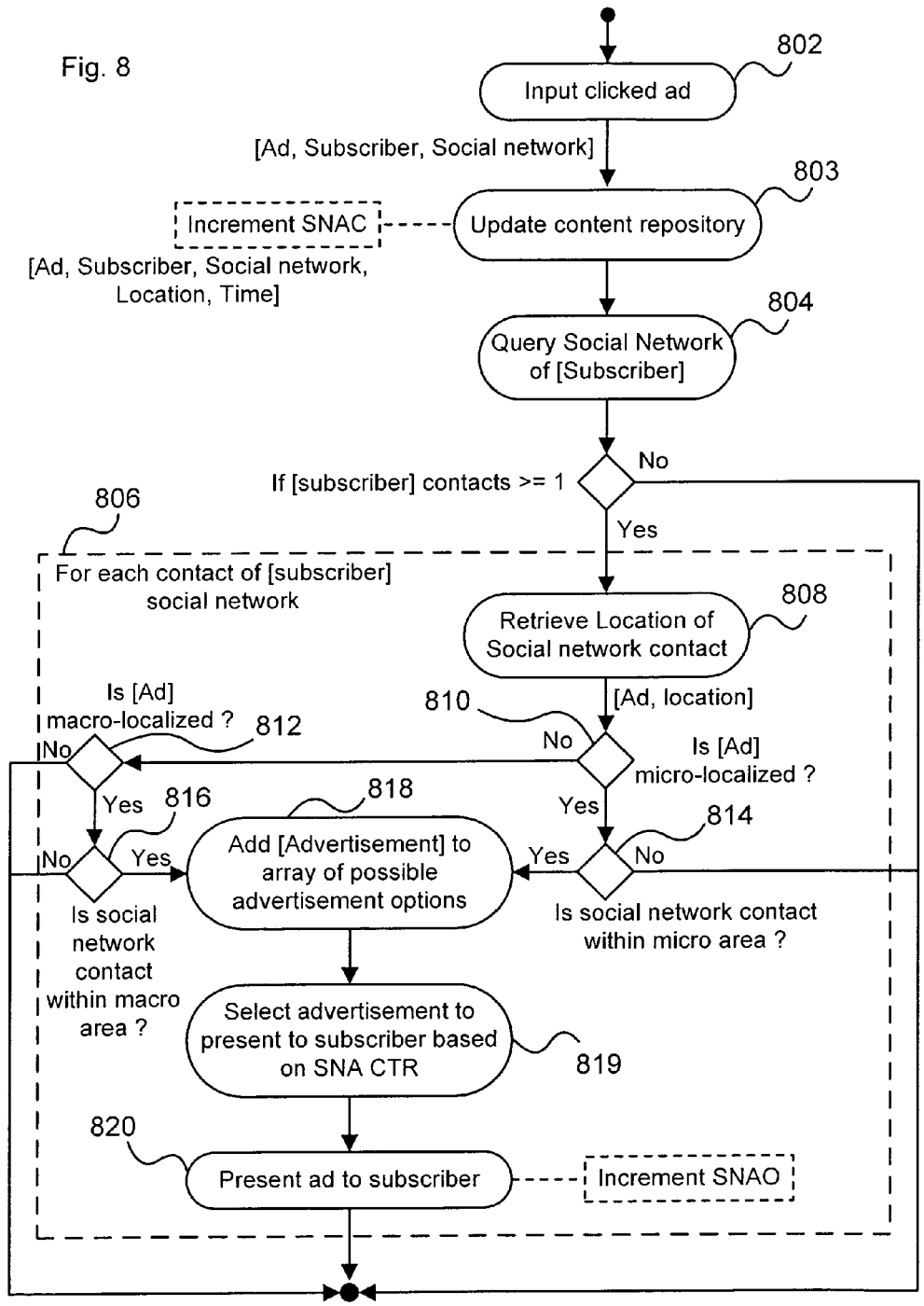
FIG. 8 is a flow diagram illustrating a third operation of the network of FIG. 1.

FIG. 8 illustrates an embodiment of a targeting mechanism for controlling a provisioning of advertisements to users in the mobile communications network 100. The method will be described with reference to the provisioning server 114 depicted in FIGS. 1 and 2. In step 802, the reception component 202 of provisioning server 114 receives an indication of an advertisement which has been clicked on or otherwise selected by user 126. The reception component 202 forwards an indication of user 126 to the retrieval component 204, for example, an MSISDN or IMSI of the mobile terminal of user 126. In step 804, the retrieval component 204 of provisioning server 114 accesses the user-related database 206 in order to retrieve contact information associated with the user 126. As said already with reference to FIG. 2, the user-related database may be a CDR database which records for each subscriber of the mobile network 100 indications of originating and terminating calls as well as text messages sent and received. The data records include an indication of the other party of the phone call or text message.

Figure 9:
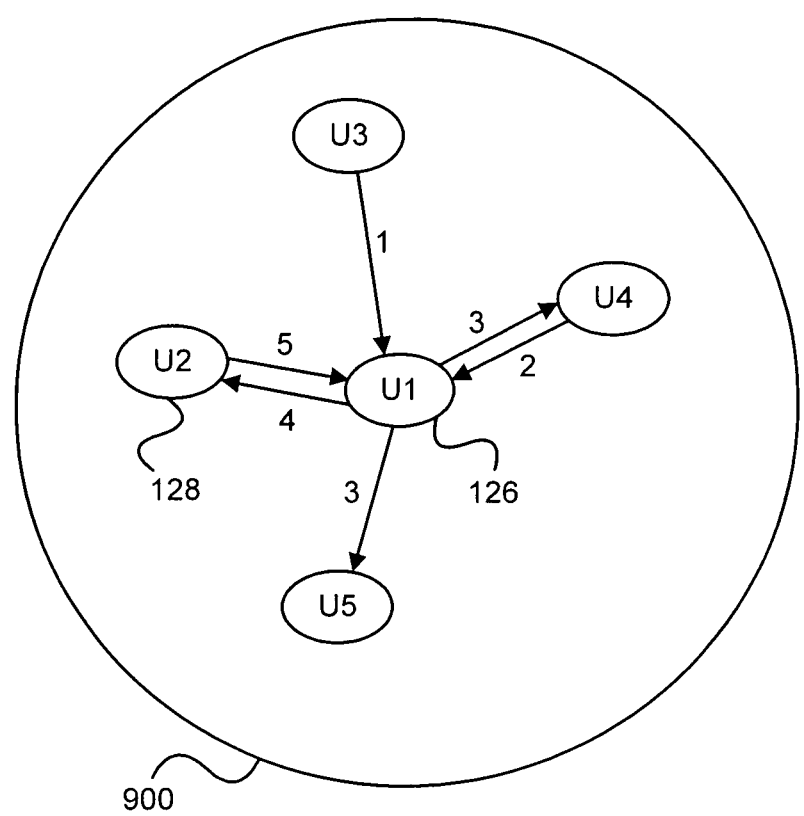
FIG. 9 schematically illustrates a social network of a user of the network of FIG. 1.

The retrieval component 204 thus may extract indications of other parties from the CDRs relating to user 126. The analysis of the CDRs may be limited to a particular past time period, e.g. two weeks or two months. In this way, the provisioning server 114 may determine (or "construct") a current "social network" of the user 126, i.e. a list of users the user 126 is in communication with, and which therefore may be thought of as belonging to the same social group. FIG. 9 schematically illustrates an example of a social network 900 which may have been determined for user 126 ("U1") in this way from CDR database 206. Various contacts of user U1 are represented as users U2-U5. For later exemplary reference, the user U2 may be user 128 indicated in FIG. 1. The social network constructed in FIG. 9 also shows the number of incoming/outgoing communications between U1 and the other parties. In order to construct a true social network and/or in order to limit the network to an appropriate size, in some embodiments rare contacts may be disregarded, i.e. a predefined minimum number of communications within the analysis time span may be required in order to be counted as belonging to the social network. As one example, at least 5 incoming or outgoing communications within the last two weeks may be required for a user to be counted as belonging to the social network of U1. In this example, according to FIG. 9 only user U2 would belong to the social network of user U1, as the users U3-U5 with a number of communications below the predefined number are not counted as members of the social network of U1.

In an alternative embodiment, the step 804 of FIG. 8 comprises to retrieve contact information of other users related to user 126 from a community database containing user profiles of users of a social network separate from the mobile network 100. For example, user 126 may be a member of a social network such as Facebook, MySpace, LinkedIn, Plaxo Pulse etc. and indications of other members may be retrieved based on searching user profile parameters such as age, gender, preferences etc. similar to those of user 126. In still other embodiments, both possibilities of searching a (CDR) database of the mobile network 100 and a community database of an social network (internal or external to the mobile network 100) are implemented.

Referring back to FIGS. 7 and 8, the mechanism illustrated in box 806 will be executed for each of the users U2-U5 counted as belonging to U1's social network. Assuming that only user U2 is determined as belonging thereto, the retrieval component 204 of provisioning server 114 provides an indication of user U2 (user 128 in FIG. 1) to the location determination component 208 of provisioning server 114 in FIG. 2. The user indication may comprise an IMSI or MSISDN of the mobile terminal of user 128. In step 808, the location determination component 208 operates to determine a location of user 128. Various possibilities exist for determining the current location of the user 128. For example, the provisioning server 114 may request an indication of the current location from the MME 118 (cf. FIG. 1; not indicated in FIG. 2). The MME 118 may in turn trigger a location determination based on techniques known, for example, from the field of location-based services. For example, the mobile terminal of user 128 may be capable of determining its location and may indicate it to the network 100, or the network 100 may determine the location based on measurements performed, e.g., by radio base stations 110 and 112.

In steps 810-818, a presentation of the advertisement which has been clicked by user 126 is prepared dependent on whether its intended presentation area covers the current location of the user 128. In steps 810 and 812, it is determined whether the intended presentation area is one of a macro area or a micro area. In other embodiments, the intended presentation could cover various macro areas and/or micro areas. Such complicated configurations can easily be reduced to a combination of the simple mechanisms illustrated in FIG. 8 and are therefore omitted herein for the sake of clarity.

Referring exemplarily to step 810 and assuming that the advertisement clicked by user 126 has an intended presentation (micro) area covering at least partly the area served by base stations 110 and 112, the retrieval component 204 provides the user indication of user 128 to the selection component 210 and the location determination component 208 provides the location of user 128 to the selection component 210, which then operates in step 814 to determine whether the intended presentation area of the clicked advertisement covers the current location of the user 128. The selection component 210 may access the content repository 116 in order to determine the intended presentation area and/or the extra annotation of whether the advertisement is micro-localised or macro-localised. In the example that the intended presentation area is Dublin and the current location of user 128 is in Dublin, in step 818 the clicked advertisement is indicated as an item which may possibly be presented to the user 128 to the provisioning component 212 of the server 114. For example, the indication may comprise an address of a storage place in the repository 116 of the advertisement.

In step 820, the provisioning component 212 operates to present the selected advertisement to user 128 by retrieving it from content repository 116 and sending it towards the user terminal of user 128. The presentation may be triggered by a user 128 request for a webpage, similar as has been described in step 702 for user 126. An advertisement may generally be kept in the content repository as long as it has been presented at least one time to each of the users belonging to the social network of user 126 (or as long as the ad is valid).

The steps 812 and 816 are performed in a similar way as has been described for the steps 810 and 814. For example, in case an advertisement has Ireland as the intended presentation area, the advertisement will be stored in a central content repository of the network 100. In step 816 it is then determined whether the current location of user 128 is in Ireland. In this way, the advertisement clicked by user 126 may be offered to related social network users currently in the same country Ireland than user 126.

In some embodiments, when receiving the indication of the advertisement clicked by user 126 in step 802, additionally the current location of user 126 may be received or determined by the provisioning server 114. In these embodiments, for the general case that the presentation area of an advertisement comprises several micro areas and macro areas (which may or may not overlap with each other), the smallest applicable area may be used in steps 814 and 816, respectively. For example, in case an advertisement has as intended presentation area 'Dublin, Ireland', and user 126 clicks on the advertisement while in Dublin, the advertisement may only presented to social network users also currently located in Dublin. In this way, for example preferred presentation areas can be implemented.

Figure 10:
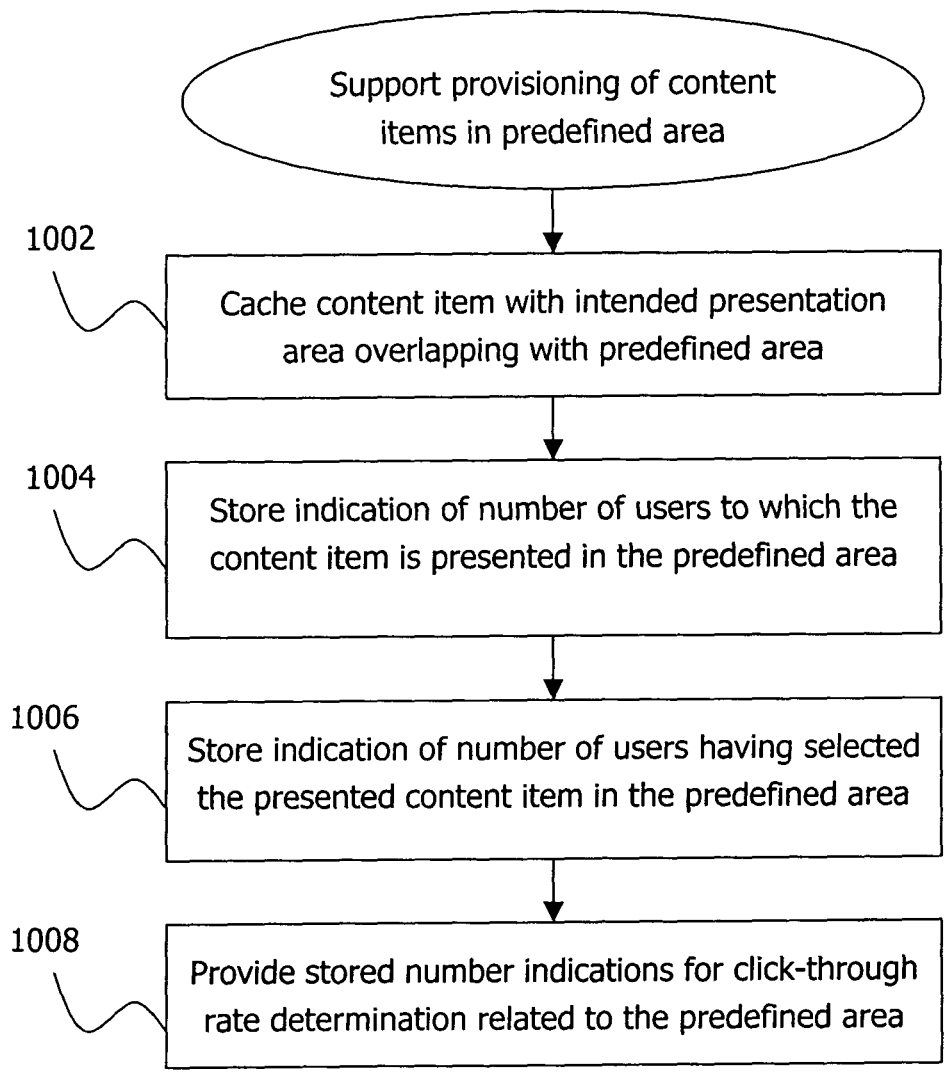
FIG. 10 is a flow diagram illustrating an operation of the repository of FIG. 3.

Referring to steps 803, 819 and 820 in FIG. 8, a monitoring mechanism may be implemented in the content repository 116, for example the repository control 308, or the provisioning server 114, for example the selection component 210. This will be described in further detail with reference to the components of the content repository 116 shown in FIG. 3 and the sequence of operational steps depicted in FIG. 10. The repository 116 may be generally adapted for supporting a provisioning of content items such as web pages, advertisements, announcements, news to users in the micro area served by radio base stations 110 and 112. In step 1002, the caching component 302 caches an advertisement with an intended presentation area overlapping with the micro area served by repository 116 (cf. step 612 in FIG. 6).

In step 1004 (see also step 820), an indication of a Social Network Advertisement Offers (SNAO) number is stored in the storage component 304. This number indicates to how many users from the social network of, for example, user 126 the advertisement stored in cache 302 has been presented (within the area served by nodes 110, 112). In step 1006 (see also step 803), an indication of a Social Network Advertisement Clicks (SNAC) number is stored in the storage component 306 in repository 116. This number indicates how many users from the social network of user 126 have actually clicked on (or otherwise selected) the advertisement of cache 302 presented to them.

The SNAO and SNAC numbers may be maintained in the repository 116 throughout the lifetime of the advertisement (or may be reset whenever the social network of a user is newly determined). In step 1008, the control component 308 operates to retrieve the SNAO number from storage 304 and the SNAC number from storage 306 in order to determine a Social Network Advertisement Click-Through Rate SNA CTR as $$SNA\ CTR = \frac{SNAO}{SNAC}.$$

The SNA CTR may be used in step 819 for ranking multiple advertisements available for presentation to user 128, i.e. in cases in which more advertisements are available than could be presented to the user.

As an example for the use of the SNA CTR, consider that user 128 is a member of several social networks constructed as described above with reference to FIG. 9. In other words, user 128 will be a contact of user 126, but also other users, e.g. a user X. A first advertisement may be prepared for presentation to user 128 according to the algorithm illustrated in FIG. 8, because user 126 has clicked on the first advertisement. A second advertisement may be prepared for presentation to user 128 because user X has clicked on the second advertisement. In case both advertisements are available for presentation, but only one of these could actually be presented, the advertisement with the highest SNA CTR might then be chosen.

The techniques proposed herein enable the provision of an efficient automatic targeting scheme for content items to users in mobile communications networks. Focusing the presentation of content items to members of a social network of a particular user who has already selected an item increases the general likelihood that this item will be of interest to the users to which it is presented. This allows to avoid usage of transmission and storage resources for content items, which are distributed without focusing, for example without taking into account social relationships and which are therefore generally not of interest to a user. Transmission and storage resources may thus be saved in the network and in mobile terminals.

The proposed techniques to a large extent re-use existing structures in mobile communications networks, e.g. CDR databases, or in the Internet, e.g. community databases of social networks such as Facebook, MySpace, LinkedIn, etc. The targeting mechanisms can therefore be implemented with minor modifications in existing networks.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for controlling a provisioning of content items to users in a mobile communications network, the method being performed by a provisioning server in the mobile communications network and comprising:
   receiving an indication of a selected content item which has been selected by a first user via a first mobile terminal;
   retrieving, from a user-related database, contact information associated with the first user, wherein the contact information comprises contact information for at least one second user;
   determining a location of a second mobile terminal of the second user;
   selectively initiating, if an intended presentation area for the selected content item covers the location of the second mobile terminal, a presentation of the selected content item to the second mobile terminal;
   determining a social network click-through rate (SNA CTR) of the selected content item based on the at least one second user indicated by the contact information of the first user, wherein determining the social network click-through rate is performed by the provisioning server, and wherein the social network click-through rate (SNA CTR) of the selected content item is determined based on a number of second users (SNAO) which have been presented with the selected content item and a number of second users (SNAC) which have clicked on the selected content item; and
   determining a ranking of the content item in relation to other content items based on the social network click-through rate (SNA CTR) of the selected content item, wherein determining the ranking is performed by the provisioning server,
   wherein the intended presentation area for the selected content item is selected from one of multiple overlapping areas with different geographical extensions,
   wherein the overlapping areas comprise at least a micro area and a macro area, and the micro area has a smaller geographical extension than the macro area, and
   wherein content items intended for presentation in the micro area are cached in a local content repository in a network portion of the mobile communications network associated with the micro area and content items intended for presentation in the macro area are cached in a central repository of the mobile communications network.

2. The method according to claim 1, wherein the first user is a mobile subscriber of the mobile communications network and the user-related database comprises a subscriber-related database associated with the mobile communications network.

3. The method according to claim 2, wherein the subscriber-related database comprises a call data record database of the mobile communications network.

4. The method according to any claim 1, wherein the user-related database comprises a community database containing user profiles of users of a social network separate from the mobile communications network.

5. The method according to claim 1, wherein initiating the presentation of the selected content item comprises initiating retrieval of the selected content item from the local repository or central repository dependent on the intended presentation area of the selected content item.

6. The method according to claim 1, further comprising:
retrieving information related to the selected content items for determining the social network click-through rate from the local repository or central repository dependent on the intended presentation area of the selected content item, wherein retrieving the information is performed by the provisioning server.

7. A non-transitory computer readable medium having computer executable instructions, which when run on a provisioning server causes the provisioning server to perform operations comprising:
receiving an indication of a selected content item which has been selected by a first user via a first mobile terminal;
retrieving, from a user-related database, contact information associated with the first user, wherein the contact information comprises contact information for at least one second user;
determining a location of a second mobile terminal of the second user;
selectively initiating, if an intended presentation area for the selected content item covers the location of the second mobile terminal, a presentation of the selected content item to the second mobile terminal;
determining a social network click-through rate (SNA CTR) of the selected content item based on the at least one second user indicated by the contact information of the first user, wherein determining the social network click-through rate is performed by the provisioning server, wherein the social network click-through rate (SNA CTR) of the selected content item is determined based on a number of second users (SNAO) which have been presented with the selected content item and a number of second users (SNAC) which have clicked on the selected content item; and
determining a ranking of the content item in relation to other content items based on the social network click-through rate (SNA CTR) of the selected content item, wherein determining the ranking is performed by the provisioning server,
wherein the intended presentation area for the selected content item is selected from one of multiple overlapping areas with different geographical extensions,
wherein the overlapping areas comprise at least a micro area and a macro area, and the micro area has a smaller geographical extension than the macro area, and
wherein content items intended for presentation in the micro area are cached in a local content repository in a network portion of the mobile communications network associated with the micro area and content items intended for presentation in the macro area are cached in a central repository of the mobile communications network.

8. The method according to claim 1, the contact information used for the determining the SNA CTR is retrieved from a call data record database of the mobile communications network.

9. The method according to claim 1, wherein the presentation of the selected content item to the second mobile terminal is an anonymous presentation of the selected content item such that the second user is not notified that the selected content item has previously been selected by the first user.

10. The method according to claim 1,
wherein determining a location of a second mobile terminal of the second user comprises determining a current location of the second mobile terminal of the second user, and
wherein selectively initiating comprises selectively initiating, if the intended presentation area for the selected content item covers the current location of the second mobile terminal, the presentation of the selected content item to the second mobile terminal.

11. A provisioning server adapted for controlling a provisioning of content items to users in a mobile communications network, comprising:
a processor; and
a memory coupled to the processor, wherein the memory is encoded with one or more programs that when executed by the processor perform the following operations,
receiving an indication of a selected content item which has been selected by a first user via a first mobile terminal,
retrieving, from a user-related database, contact information associated with the first user, wherein the contact information comprises contact information for at least one second user,
determining a location of a second mobile terminal of the second user, and
selectively initiating, if an intended presentation area for the selected content item covers the location of the second mobile terminal, a presentation of the selected content item to the second mobile terminal,
determining a social network click-through rate (SNA CTR) of the selected content item based on the at least one second user indicated by the contact information of the first user, wherein determining the social network click-through rate is performed by the provisioning server, and wherein the social network click-through rate (SNA CTR) of the selected content item is determined based on a number of second users (SNAO) which have been presented with the selected content item and a number of second users (SNAC) which have been clicked on the selected content item, and
determining a ranking of the content item in relation to other content items based on the social network click-through rate (SNA CTR) of the selected content item, wherein determining the ranking is performed by the provisioning server,
wherein the presentation of the selected content item to the second mobile terminal is an anonymous presentation of the selected content item such that the second user is not notified that the selected content item has previously been selected by the first user.

12. The provisioning server according to claim 11,
wherein determining a location of a second mobile terminal of the second user comprises determining a current location of the second mobile terminal of the second user, and
wherein selectively initiating comprises selectively initiating, if the intended presentation area for the selected content item covers the current location of the second mobile terminal, the presentation of the selected content item to the second mobile terminal.

13. The provisioning server according to claim 11, wherein the intended presentation area for the selected content item is selected from one of multiple overlapping areas with different geographical extensions.

* * * * *